(12) United States Patent
D'Hers et al.

(10) Patent No.: US 7,533,348 B2
(45) Date of Patent: May 12, 2009

(54) SYSTEM THAT FACILITATES MAINTAINING BUSINESS CALENDARS

(75) Inventors: Thierry D'Hers, Redmond, WA (US); Aleksandar Juric, Redmond, WA (US); Akshai M. Mirchandani, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 343 days.

(21) Appl. No.: 11/054,302

(22) Filed: Feb. 9, 2005

(65) Prior Publication Data

US 2006/0010155 A1    Jan. 12, 2006

Related U.S. Application Data

(60) Provisional application No. 60/586,644, filed on Jul. 9, 2004.

(51) Int. Cl.
G06F 3/048 (2006.01)
G06F 17/00 (2006.01)

(52) U.S. Cl. .................. 715/764; 715/963; 707/102; 707/104.1

(58) Field of Classification Search ............ 715/765, 715/963, 764; 707/102, 104.1
See application file for complete search history.

(56) References Cited

U.S. PATENT DOCUMENTS

| | | | |
|---|---|---|---|
| 5,293,615 A | 3/1994 | Amada | |
| 5,767,854 A | 6/1998 | Anwar | |
| 5,855,018 A | 12/1998 | Chor et al. | |
| 5,878,423 A | 3/1999 | Anderson et al. | |
| 5,930,762 A | 7/1999 | Masch | |
| 5,969,974 A | 10/1999 | Vanderbelt et al. | |
| 5,970,482 A | 10/1999 | Pham et al. | |
| 5,970,493 A | 10/1999 | Shoup et al. | |
| 5,974,572 A | 10/1999 | Weinberg et al. | |
| 6,006,223 A | 12/1999 | Agrawal et al. | |
| 6,044,219 A * | 3/2000 | Lips | 717/106 |
| 6,078,918 A | 6/2000 | Allen et al. | |
| 6,108,640 A * | 8/2000 | Slotznick | 705/26 |
| 6,108,647 A | 8/2000 | Poosala et al. | |
| 6,430,545 B1 | 8/2002 | Honarvar et al. | |
| 6,470,352 B2 | 10/2002 | Yaginuma et al. | |
| 6,477,538 B2 | 11/2002 | Yaginuma et al. | |
| 6,651,055 B1 | 11/2003 | Kilmer et al. | |
| 6,662,195 B1 * | 12/2003 | Langseth et al. | 707/200 |
| 6,675,356 B1 * | 1/2004 | Adler et al. | 715/530 |
| 6,721,715 B2 | 4/2004 | Nemzow | |
| 6,853,994 B1 | 2/2005 | Gupta | |
| 6,973,491 B1 | 12/2005 | Staveley et al. | |

(Continued)

OTHER PUBLICATIONS

Blakeley, Jose A., "Data Access for the Masses through OLE DB". SIGMOD '96, ACM, Jun. 1996, p. 161-172.

(Continued)

*Primary Examiner*—Ting Zhou
(74) *Attorney, Agent, or Firm*—Amin, Turocy & Calvin, LLP

(57) ABSTRACT

A calendar customization system comprises an interface component that receives responses to one or more questions relating to a calendar. A execution automatically generates a multi-dimensional structure for the calendar, the structure generated as a function of the responses. For example, the multi-dimensional structure can relate to a Gregorian calendar, a fiscal calendar, a reporting calendar, a manufacturing calendar, and/or an ISO8601 calendar.

17 Claims, 17 Drawing Sheets

U.S. PATENT DOCUMENTS

| | | |
|---|---|---|
| 6,990,480 B1 | 1/2006 | Burt |
| 7,062,757 B2 | 6/2006 | Honarvar et al. |
| 7,076,475 B2 | 7/2006 | Honarvar |
| 7,181,440 B2 | 2/2007 | Cras et al. |
| 7,222,130 B1 | 5/2007 | Cras et al. |
| 2001/0011241 A1 | 8/2001 | Nemzow |
| 2001/0054034 A1 | 12/2001 | Arning et al. |
| 2002/0032609 A1* | 3/2002 | Wilkman .................... 705/14 |
| 2002/0111934 A1 | 8/2002 | Narayan |
| 2003/0023463 A1* | 1/2003 | Dombroski et al. ............ 705/5 |
| 2003/0046303 A1 | 3/2003 | Chen et al. |
| 2004/0111428 A1* | 6/2004 | Rajan et al. ................ 707/102 |
| 2004/0188998 A1* | 9/2004 | Henthorn .................... 283/900 |
| 2005/0165733 A1 | 7/2005 | Strovink |
| 2005/0222972 A1 | 10/2005 | Mishra et al. |
| 2006/0010157 A1 | 1/2006 | Dumitrascu et al. |
| 2007/0118501 A1 | 5/2007 | Yan |

OTHER PUBLICATIONS

Microsoft OLE DB for OLAP: Programmer's Reference, Microsoft Corporation, Dec. 1998.

OLE DB for Data Mining Specification Version 1.0. Microsoft Corporation, Jul. 2000. 133 pgs.

* cited by examiner

SYSTEM THAT FACILITATES MAINTAINING BUSINESS CALENDARS

REFERENCE TO RELATED APPLICATIONS

This application claims the benefit of U.S. Provisional Application Ser. No. 60/586,644 filed on Jul. 9, 2004, and entitled SYSTEMS AND METHODS THAT FACILITATE SOLVING BUSINESS PROBLEMS. The entirety of this application is incorporated herein by reference.

TECHNICAL FIELD

The subject invention relates generally to multi-dimensional data, and more particularly to automatically generating structures in a multi-dimensional environment that relate to one or more calendars.

BACKGROUND OF THE INVENTION

The evolution of computers with respect to memory storage expansion and processing capabilities has enabled massive amounts of data to be accumulated and analyzed by complex and intelligent algorithms. For instance, given an accumulation of data, algorithms can analyze such data and locate patterns therein. These patterns can then be extrapolated from the data, persisted as content of a data mining model or models, and applied within a desired context. With the evolution of computers from simple number-crunching machines to sophisticated devices, services can be provided that range from video/music presentation and customization to data trending and analysis.

Accordingly, tasks that at one time required skilled mathematicians to perform complex operations by hand can now be automated through utilization of computers. In a simplistic example, many individuals, rather then utilizing a skilled accountant to compute their tax liability, quickly enter a series of numbers into a computer application and are provided customized tax forms from such application. Furthermore, in a web-related application, tax forms can automatically be delivered to a government processing service. Thus, by way of utilizing designed algorithms, data can be manipulated to produce a desired result.

As a number of relationships and complexity in data increases, however, analysis and presentation of data in a desired manner can become extremely difficult. For instance, calendars of one form or another have been utilized since commencement of human existence. In a particular example, orbital patterns of the moon can be monitored to approximately determine a beginning and end of a month. Today, calendars are utilized to track personal events, analyze sales over time (e.g., comparing sales with respect to a portion of one year with sales associated with a similar portion of a disparate year), monitor manufacturing output, and the like. Continuous accumulation of data has rendered calendars more vital for sales and manufacturing analysis than ever before. Businesses can alter sales strategies based upon calendar analysis, industries can monitor output and make alterations to machinery and/or personnel as a function of calendar analysis, etc. Often, depending on a business context, it is desirable to customize a calendar to present or analyze data in a specific manner. For example, different businesses utilize disparate dates to indicate commencement of a fiscal year. In particular, a first business can associate a beginning of a fiscal year with January 1, while a second business can associate a beginning of a fiscal year with July 1. In another example, different countries can utilize disparate dates to indicate commencement of a new year. Accordingly, it is often desirable to customize calendars in accordance with disparate user needs.

Conventionally, however, customizing a calendar has been an extremely time-consuming and tedious task. In particular, undertaking such customization in a multi-dimensional environment is a task that often requires one skilled in the art to manipulate and define various fields within a spreadsheet application. For example, to generate a customized calendar structure in a multi-dimensional environment, currently an individual opens a spreadsheet application and populates such application with a substantial amount of information. For instance, the individual must manually enter data into a spreadsheet, define columns in the spreadsheet application with several columns relating to calendar groupings, define properties associated with calendars, define time instances, and the like. If ten years worth of data is desirably inserted into the spreadsheet, then approximately 3652 rows of the spreadsheet must manually be entered into such spreadsheet, and data therein must be associated with definitions that enable generation of the calendar structure in a multi-dimensional environment. Once all relevant data has been entered and properties/associations have been defined, the spreadsheet is converted into a database table (such as a SQL table). Thereafter, one or more cube structures can be generated from the SQL table, where the resultant structures enable output of the calendar with properties specified in the spreadsheet application. From the above description, it can easily be discerned that substantial cost is associated with customizing a calendar in a multi-dimensional environment, as substantial skill and time is necessary for the above-described generation of a desirable calendar.

Accordingly, there exists a need in the art for a system and/or methodology that can be utilized to automatically customize a calendar in a multi-dimensional environment.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to novel systems and/or methods that enable a user that is not an expert in database manipulation to automatically generate and/or update a multi-dimensional structure that can be employed to create a customized calendar. Creation of the multi-dimensional structure is based at least in part upon responses received by a user to questions presented by an interface component (for instance, a graphical user interface). The term "questions" is intended to encompass literal questions presented to a user, selectable actions presented to a user, selectable data and/or attributes presented to a user, and any other selectable entity. The responses can thus be answers to presented questions, selections of actions and/or data, and the like.

Various user interfaces can be presented to a user to enable obtainment of sufficient information to generate a customized calendar. For instance, a user interface can be presented that allows a user to map time-related properties to columns within a data structure. The interfaces can also include selectable dates relating to a calendar—for instance, when a fiscal year begins, how the year is to be divided for analysis (e.g., semesters, trimesters, quarters, . . . ). Thus, a series of interfaces presenting one or more questions can be provided to a user, and the user can respond to such questions in order to generate a calendar of a particular type with desired properties. The calendar type can be, for example, a Gregorian calendar, a fiscal calendar, a manufacturing calendar, a reporting calendar, an ISO 8061 calendar, or any other suitable calendar type.

Upon receiving adequate information, the interface component can generate statements and/or commands that are understood by an execution engine. The execution engine can access calendar definitions, logic, and schema that enables such engine to create a multi-dimensional structure that can be employed to generate a calendar customized according to the obtained responses. For instance, the execution engine can generate hierarchies within a data cube, wherein such hierarchies can be utilized to generate a desired calendar. For example, a relational data structure can be queried by way of the generated/updated multi-dimensional structure, and a calendar can be populated with data as a function of the query.

In accordance with one aspect of the subject invention, the questions can be presented in a particular sequence, wherein the sequence is based at least in part upon responses to previously presented questions. For example, a second question is presented upon a first question being responded to in a particular manner. Similarly, whether a third question is presented can depend on a manner to which the second question is responded. This listing of questions can be held within a question list, which is accessed when presenting the questions to a user. The question list can be updated with disparate questions as different calendar types become available and/or additional calendar properties are made available.

In accordance with another aspect of the subject invention, a security component can be employed to determine whether a particular user or users are authorized to generate a multi-dimensional calendar structure and/or update an existing multi-dimensional calendar structure. For instance, a user in an accounting department of a company may have no reason to update a multi-dimensional structure relating to manufacturing. Thus, the security component can prevent such user from updating the multi-dimensional structure. Furthermore, different users can be associated with disparate levels of security—for instance, a president of a company may have read/write access to entireties of all existent multi-dimensional structures relating to calendars within a database system. Lower-level management, however, may only have read/write access to a single multi-dimensional structure, while having read-only access to other multi-dimensional structures.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
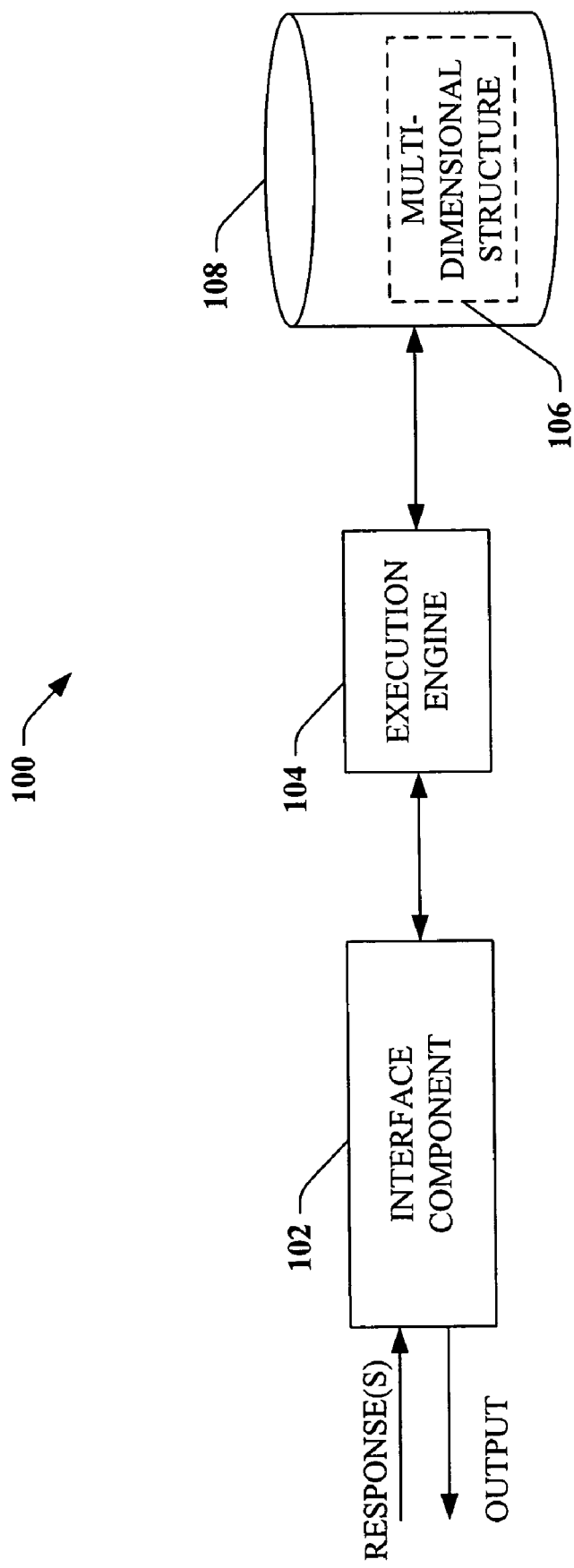
FIG. 1 is a high-level block diagram of a system that facilitates automatically generating/updating a multi-dimensional object relating to a calendar in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Referring now to the drawings, FIG. 1 illustrates a high-level system overview in connection with one particular aspect of the subject invention. The subject invention relates to a system 100 that facilitates automatic generation of a calendar structure in a multi-dimensional environment, wherein the term "automatic" refers to an ability to generate the calendar structure without requiring a user to manually create a spreadsheet that defines a time dimension for disparate calendar types. The system 100 includes an interface component 102 that receives responses from a user, wherein the responses relate to one or more questions presented to such user by way of the interface component 102. For instance, the questions can pertain to a type of calendar desirably created (Gregorian, fiscal, manufacturing, 10-day, . . . ), language in which to present the calendar, first day of a year (for instance, if a fiscal calendar is desirably generated), and any other variety of suitable questions that can assist in generation of a calendar. Moreover, it is to be understood that the term "questions" is intended to cover questions presented to a user by way of the interface component 102, selectable actions presented to the user, and/or selectable data presented to the data. Thus, for example, if the interface component 102 provides a user with a list of selectable columns, such list can be referred to as one or more questions.

The interface component 102 can utilize any suitable mechanisms for presenting questions to a user and receiving responses from such user. For instance, graphical user interfaces that include questions can be presented to the user, and the user can respond to the questions by way of pointing and clicking mechanisms, pressure-sensitive screens, keystrokes, or the like. Furthermore, the user can respond to the questions by way of voice commands, where the interface component 102 includes voice-recognition software that recognizes audio responses to questions presented to such user. Thus, any suitable means of presenting questions to a user and receiving responses from the user is contemplated by the inventors of the subject invention and intended to fall under the scope of the hereto-appended claims. Upon receiving one or more responses to the presented questions, the interface component 102 can generate statements and/or commands that are received and understood by an execution engine 104, wherein such execution engine 104 can be employed in a multi-dimensional environment.

In accordance with one aspect of the subject invention, the execution engine 104 can be an online analytical processing (OLAP) engine. OLAP engines are often utilized in connection with providing data relating to complex database queries, and can be employed with respect to business reporting for sales, marketing, management reporting, data mining and similar areas. OLAP systems are typically much faster than traditional database querying systems/methodologies, as snapshots of relational databases are obtained and restructured into dimensional data, which are often referred to as data cubes. Data cubes allow users to explore and analyze a collection of data from several various perspectives, usually considering three or more dimensions of the cube (or dimensions relating to the cube) at a single instance of time. Data cubes can be considered multidimensional extensions of relational two-dimensional tables, and can be associated with numerous dimensions (e.g., well over three dimensions).

In accordance with another aspect of the subject invention, the execution engine 104 and/or the interface component 102 can be associated with definitions of a calendar structure. Upon the interface component 102 receiving responses to the questions, the execution engine 104 can utilize statements generated by the interface component 102 to generate and/or update a multi-dimensional structure 106. The generated/updated multi-dimensional structure 106 can be a data cube, a dimension of a cube, a hierarchy, attributes relating to a data cube, and the like. Thus, if the multi-dimensional structure is pre-existent and is modified by the execution engine 104, then the multi-dimensional structure 106 can be any suitable data existent within a multi-dimensional environment. If the execution engine 104 is generating the multi-dimensional structure 106 de novo, then such structure 106 can be a data cube and/or a series of data cubes.

The multi-dimensional structure 106 can exist within a file system within a data store 108 (e.g., a hard drive upon a server, a tape, . . . ) that also contains one or more relational databases. Thus, upon generation and/or updating of the multi-dimensional structure 106, such structure 106 can be utilized in connection with extracting data from relational tables within the data store 108. Therefore, upon the execution engine 104 generating and/or updating the multi-dimensional structure 106 in accordance with the responses received by the interface component 102, the multi-dimensional structure 106 can be employed to output a customized calendar to a user. For instance, the questions output by the interface component 102 can relate to a fiscal year calendar, and a user can provide responses relating to beginning of a fiscal year, length of time between business reports, and any other suitable questions/responses.

Thus, rather than requiring the user to manually generate a spreadsheet with a plurality of columns and rows that must be defined, the system 100 enables a user simply to input responses to a series of questions provided by the interface component 102. Thereafter, a customized calendar structure as well as data therein can be provided to the user for analysis. For instance, in accordance with one aspect of the subject invention, the calendar structure can relate to one or more of a Gregorian calendar, a fiscal calendar, a reporting calendar, a manufacturing calendar, and an ISO8601 calendar.

Figure 2:
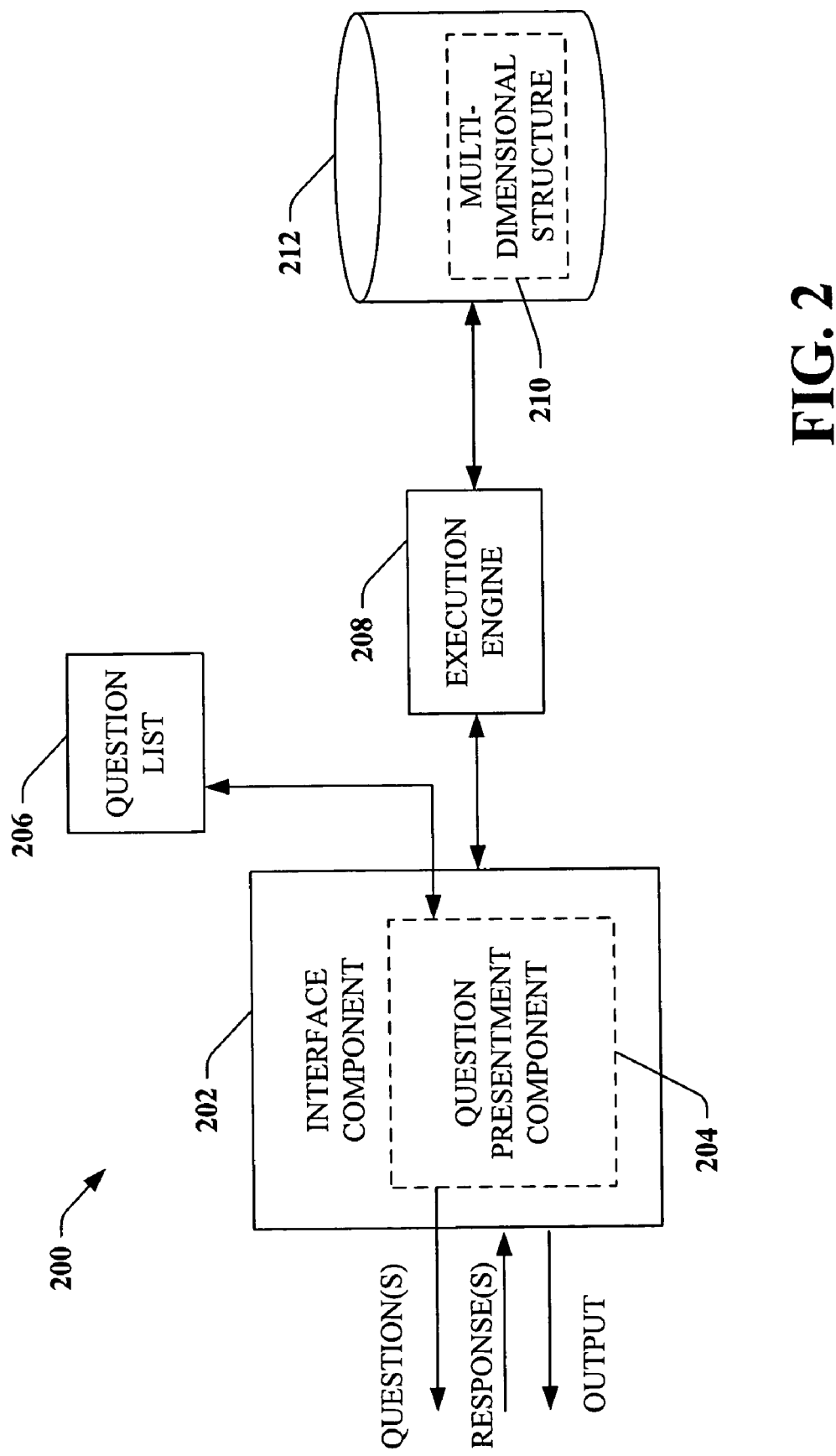
FIG. 2 is a block diagram of a system that facilitates obtaining information from a user to automatically generate/update a multi-dimensional object relating to a calendar in accordance with an aspect of the subject invention.

Turning now to FIG. 2, a system 200 that facilitates automatic generation/updating of a multi-dimensional structure that can be utilized to output a customized calendar is illustrated. The system 200 includes an interface component 202 that is employed in connection with outputting questions to a user relating to customizable calendars and receiving responses to such questions. In particular, the interface component 202 includes a question presentment component 204 that presents the questions to the user by selecting questions from a question list 206. The question list 206 can be an extensible list, wherein additional functionality relating to one or more calendars supported by the system 200 can be effectuated by way of responses to added questions within the question list 206. Moreover, the question list 206 can be utilized to at least partially determine a sequence of questions to be presented to the user by way of the question presentment component 204. For instance, a second question can depend on a manner in which the user responds to a first question, and a third question can depend on a manner in which the user has responded to the first and second questions, and so forth. Thus, the question list 206 can include linkages between questions therein to enable the question presentment component 204 to present questions to the user in a logical order.

Upon receiving responses to the questions, the interface component 202 can generate statements and/or commands informing an execution engine 208 to generate and/or update a multi-dimensional structure 210 within a data store 212. For example, the execution engine 208 can comprise and/or be privy to calendar definitions, and such definitions can be extended and/or populated based at least in part upon the responses received by the interface component 202. The execution engine 208 can further receive and/or be associated with a location in memory of the data store 212 to store the multi-dimensional structure 210. In accordance with one aspect of the subject invention, the location in memory can be specified through responses to the questions presented by the question presentment component 204. In accordance with another aspect of the subject invention, the execution engine 208 can perform a search of the data store 212 and automatically locate a location in memory to store the multi-dimensional structure 210.

The system 200 thus allows a user to automatically generate and/or update the multi-dimensional structure 210, wherein such structure 210 relates to a customized calendar. For instance, upon generating the multi-dimensional structure 210 (which relates to a calendar), such structure 210 can be utilized to generate the customized calendar by querying a relational store by way of the structure 210. A populated, customized calendar can then be returned to the user. As stated previously, multi-dimensional structures are beneficial over strictly relational databases, as they can be utilized to obtain data from a data store at a much faster rate when compared to strictly relational databases. In accordance with another aspect of the subject invention, not only can the questions and responses relate to generation of the multi-dimensional structure 210, but they can also relate to outputting a customized calendar. For instance, the questions can be utilized to assist in defining and developing a time dimension, which is utilized to generate and/or update the multi-dimensional structure 210. The questions can also relate to type of calendar desired, first day of such calendar, and several other associated questions. Thus, the execution engine 208, which can have access to calendar definitions relating to several disparate calendars (e.g., Gregorian, fiscal, manufacturing, ISO, . . . ), can generate an appropriate structure. Further, calendar content description (e.g., year descriptions, month descriptions, week descriptions, days descriptions, . . . ) can be associated with one or more languages in which the calendar can be presented.

Figure 3:
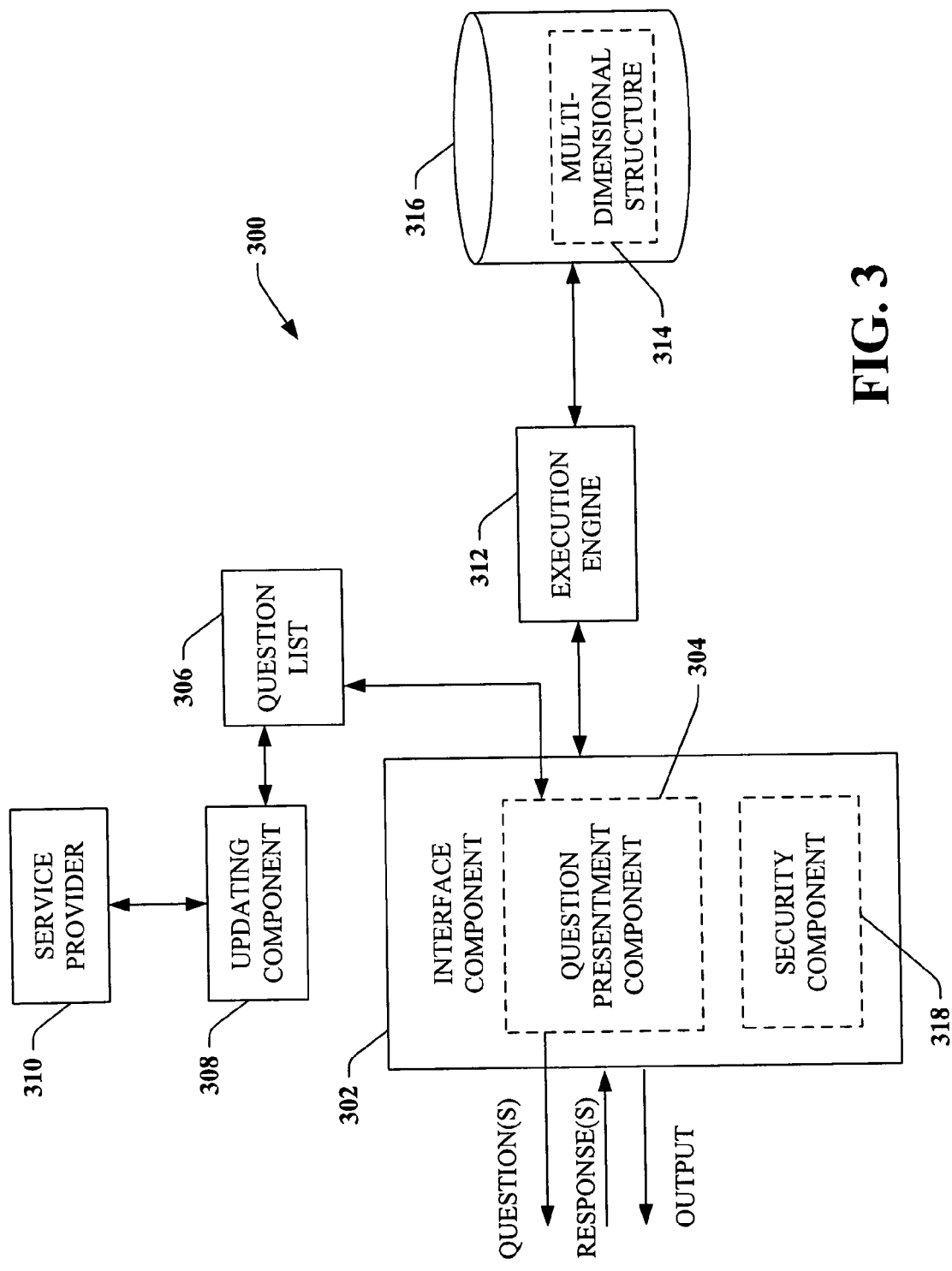
FIG. 3 is a block diagram of a system that facilitates updating questions that can be presented to a user in order to automatically generate a multi-dimensional object relating to a calendar in accordance with an aspect of the subject invention.

Referring now to FIG. 3, a system 300 that facilitates generation of a customized calendar by way of automatic creation/updating of a multi-dimensional structure is illustrated. The system 300 includes an interface component 302 that is utilized to receive responses to questions relating to a customized calendar. The interface component 302 includes a question presentment component 304 that presents one or more questions to a user. For instance, the questions can be presented to the user in a sequence, where the sequence depends upon previously responded to questions. The question presentment component 304 can be communicatively coupled to a question list 306 that includes questions (associated with possible responses) that are supported by the system 300.

The question list 306 can be associated with an updating component 308 that is utilized to extend the questions within the question list 306, and thereby extend usability of the system 300. For instance, disparate calendar structures can be delivered to the system 300 by way of the updating component 308, and the system 300 can be updated accordingly. In particular, the question list 306 will include further questions that can be responded to by the user, and a customized calendar can be output as a function of the responses (by way of generation and/or updating of a multi-dimensional structure). The updating component 308 can be associated with a service provider 310 that can monitor the system 300 and provide updates to the updating component 308 according to system uses/requirements. For instance, the service provider 310 can determine that the system 300 has not been updated with particular calendar structure definitions, and thereafter deliver an option to purchase/receive the updates by way of the interface component 302. Thereafter, the user can determine whether the available functionality should be added to the system 300 through the updating component 308. In accordance with one aspect of the subject invention, the service provider 310 can inform the user of availability of additional and/or updated functionality by way of the Internet.

Upon receiving the responses, the interface component 302 can provide an execution engine 312 with sufficient information to generate a multi-dimensional structure 314 that is utilized to generate a customized calendar (in accordance with the received responses). For instance, the execution engine 312 can be an OLAP engine that can include logic and schema that enables generation of the multi-dimensional structure 314, wherein such structure 314 relates to a customized calendar. The multi-dimensional structure 314 can be stored in a data store 316, and can be associated with a graphical object that enables subsequent generation of the structure 314 (and output of a calendar) without forcing a user to first re-submit responses to questions output by the question presentment component 304. For instance, the multi-dimensional structure 314 can be associated with relational data tables, wherein data is extracted from the tables by way of the structure 314. Thus, if data is added to the relational tables, the multi-dimensional structure 314 together with appropriate queries can be employed to extract desirable data from the relational tables. A customized calendar can then be populated with this additional data by way of simply selecting a graphical object (rather than answering the questions). Thus, the calendar may only have to be generated once and can be updated repeatedly as data changes.

The interface component 302 can further include a security component 318 that regulates access to the system 300. For example, it may not be desirable to allow particular users to update the multi-dimensional structure 314. More specifically, a user with a role associated with accounting may not be authorized to update the multi-dimensional structure 314 if such structure 314 is associated with a manufacturing calendar. In another example, it may be desirable to only provide editable access to the multi-dimensional structure 314 to individuals in a management capacity, and not, for example, to salesmen. The security component 318 can utilize conventional techniques, such as requesting and analyzing usernames, passwords, personal identification numbers (PINs), and the like. In accordance with another aspect of the subject invention, the security component 318 can employ more advanced security techniques, such as analyzing biometric indicia (e.g., voice analysis techniques, fingerprint analysis, retina scans, . . . ). In accordance with yet another aspect of the subject invention, users can be associated with disparate levels of access to the multi-dimensional structure 314 by way of the security component 318. For instance, a first user may have read-only privileges with respect to the multi-dimensional structure, a second user may have read/write privileges to the multi-dimensional structure 314, a third user may be prohibited from reading from and/or writing to the multi-dimensional structure, and so on. Furthermore, disparate portions of the multi-dimensional structure 314 can be associated with different security levels for disparate users. For instance, a user may have one level of access to one hierarchy within the multi-dimensional structure 314 and have a disparate level of access to a different hierarchy within such structure 314. These levels of access can be assigned through user roles or any other suitable means of assigning security levels.

Figure 4:
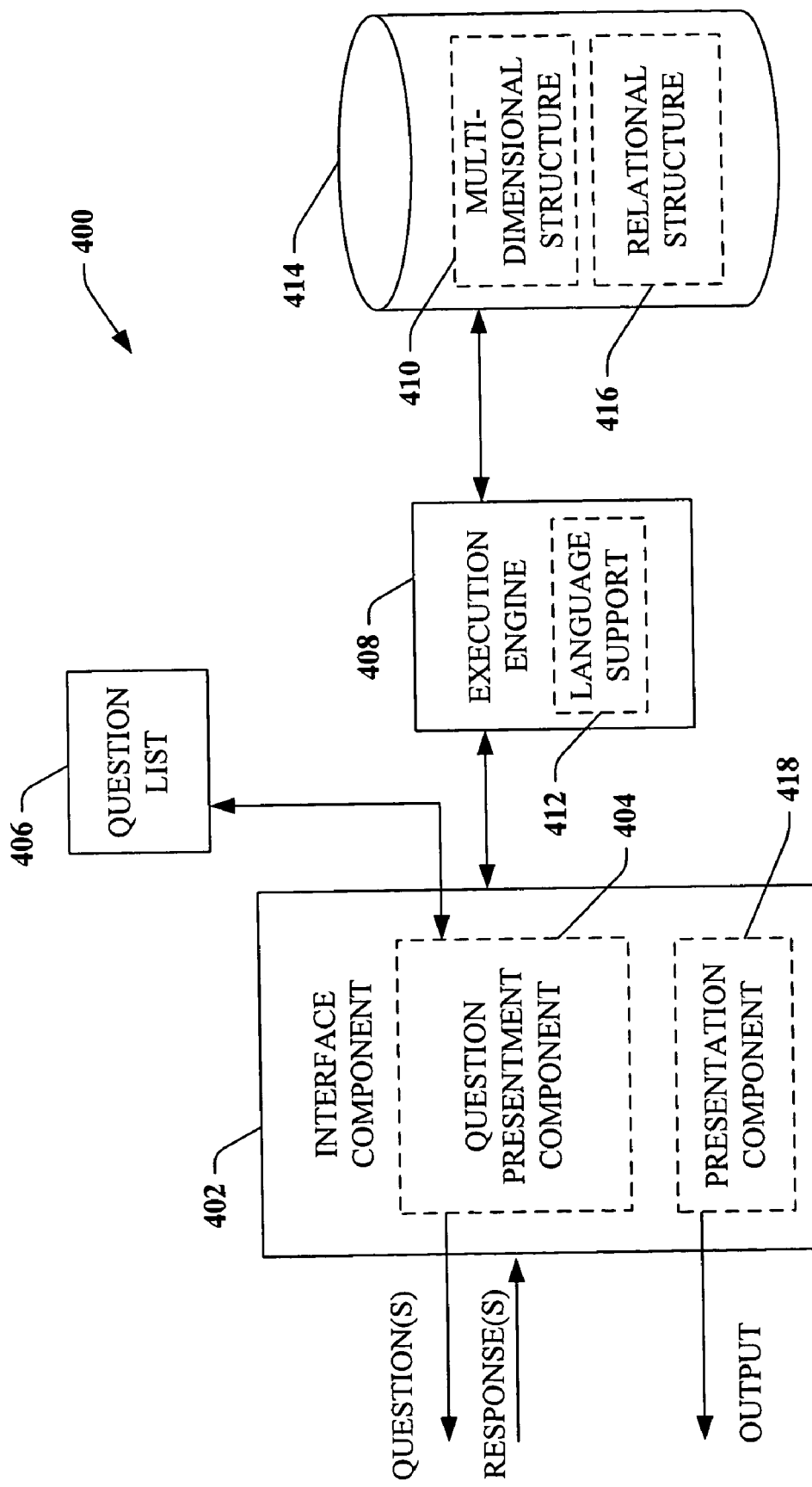
FIG. 4 is a block diagram of a system that facilitates generating a customized calendar in a selected language in accordance with an aspect of the subject invention.

Turning now to FIG. 4, a system 400 that facilitates creation of a customized calendar is illustrated. The system 400 includes an interface component 402 that obtains information relating to customization of a calendar from a user. In particular, the interface component 402 utilizes a question presentment component 404 to solicit information from the user relating to a customized calendar. In particular, the question presentment component 404 obtains questions to present to a user from a question list 406. The question list 406 can be employed to determine a sequence of questions provided to the user, wherein the sequence depends upon user responses. The interface component 402 receives the user responses and generates statements/commands therefrom that are recognizable by an execution engine 408. For instance, the execution engine 408 can be associated with a plurality of calendar definitions, and upon receiving the responses utilize such definitions to generate a multi-dimensional structure 410. Furthermore, the execution engine 408 can be associated with a language component 412 that supports various different languages (e.g., a customized calendar can be output in any of a plurality of selectable languages). Furthermore, while not shown, the language component 412 can be associated with an updating component that enables output of a calendar in additional languages as support for such languages is added to the system 400.

In accordance with one aspect of the subject invention, the execution engine 408 can be an OLAP engine that is employable within a multi-dimensional environment. Such execution engine 408 can facilitate generating the multi-dimensional structure 410 and storing such structure in a data store 414. The data store 414 can further house a relational structure 416, such as one or more relational tables. Data within the relational structure 416 can then be extracted by way of queries through the execution engine 408 and the multi-dimensional structure 410. Thus, in accordance with the subject invention, the multi-dimensional structure 410 can relate to a customized calendar. This calendar can then be populated with pertinent data within the relational structure 416 by querying against the multi-dimensional structure 410.

Upon the multi-dimensional structure 410 being generated/updated by the execution engine 408 and the interface component 402, and upon generation of a customized calendar, a presentation component 418 (associated with the interface component 402) can present the customized calendar to the user who provided the responses. For instance, the presentation component 418 can present a customized calendar by way of a graphical user interface (GUI) or any other suitable display means. For instance, the GUI can be displayed by way of a projector device. In another example, the customized calendar can be printed in order to present such calendar to the user.

Figure 5:
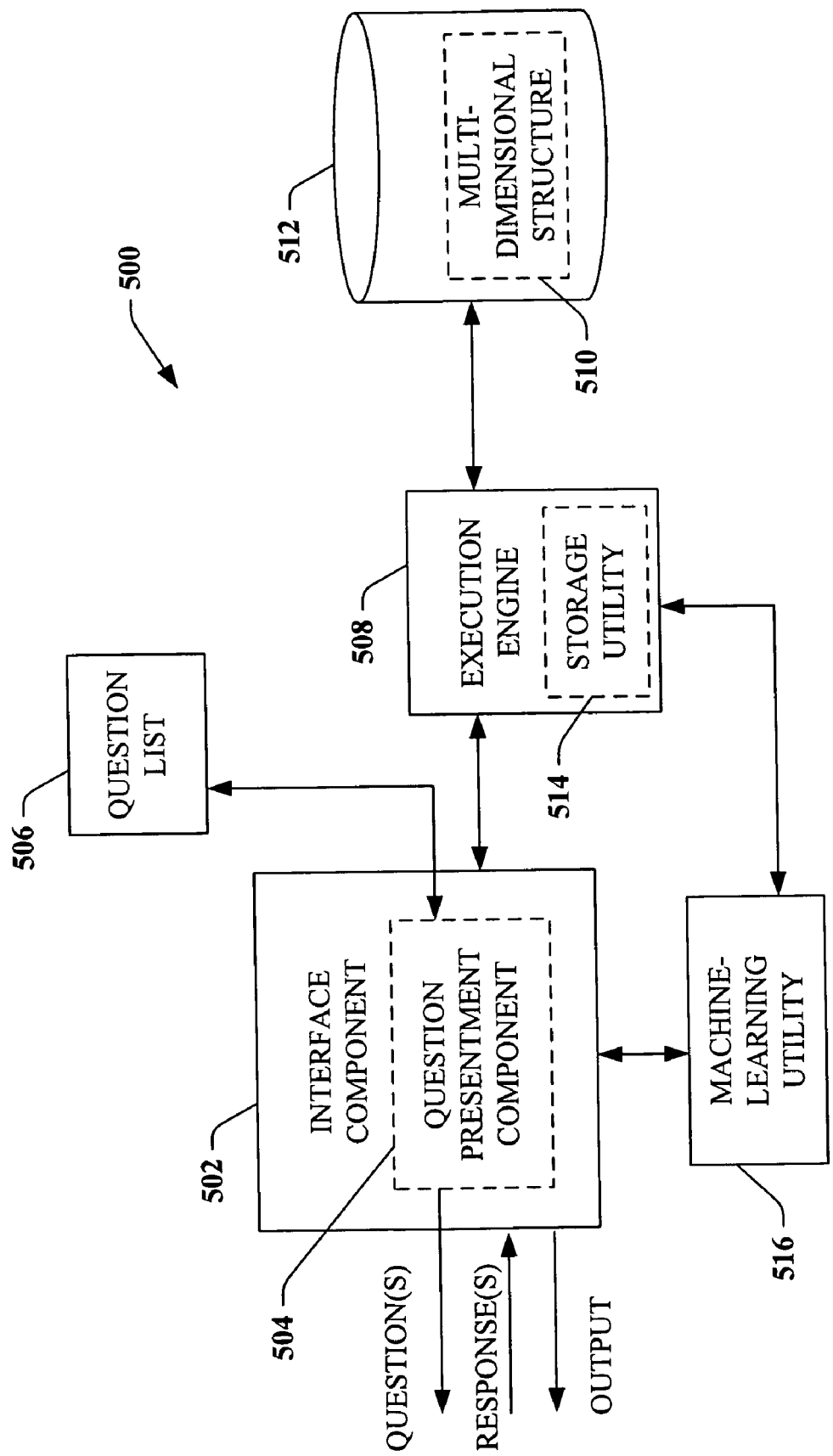
FIG. 5 is a block diagram of a system that facilitates storing the multi-dimensional structure in a manner that allows a user to easily re-use such structure in accordance with an aspect of the subject invention.

Referring now to FIG. 5, a system 500 that enables a user not skilled in database manipulation to automatically generate a multi-dimensional object utilized to create a customized calendar is illustrated. The system 500 includes an interface component 502 that is utilized to obtain sufficient information to generate/update a multi-dimensional structure that can be employed to create a customized calendar. The interface component 502 obtains the information by way of a question presentment component 504, which provides a user with one or more questions. The questions can be obtained from a question list 506, and which questions within the question list 506 to present to the user can depend upon responses to previous questions.

Upon obtaining adequate information, the interface component 502 generates statements/commands that are suitable for use with an execution engine 508. For example, the execution engine 508 can be associated with calendar definitions, wherein such definitions as well as logic and schema associated therewith can be utilized in connection with information obtained by the interface component 502 to generate a multi-dimensional structure 510 and store such structure within a data store 512. The multi-dimensional structure 510 can then be utilized to obtain data from one or more relational tables within the data store 512 and associated with the structure 510. For instance, the execution engine 508 can query the multi-dimensional structure 510 and return results of the query to the interface component 502 (wherein results relate to a customized calendar). The interface component 502 can then output a customized calendar to the user.

In accordance with one aspect of the subject invention, the execution engine 508 can be associated with a storage utility 514 that assists in storing the multi-dimensional structure 510 within the data store 512 (e.g., determines an appropriate location for storage) as well as creates an object that enables the calendar to be re-generated (with additional data) without answering the questions presented by the question presentment component 504. More specifically, a user can answer questions presented and a multi-dimensional structure 510 can be created/updated based upon the responses. Thereafter, data can be added that is desirably inserted into the calendar, wherein the data is defined in a substantially similar manner when compared to existing data. Rather than re-answering questions to update the calendar, the storage utility 514 can create a selectable object that facilitates updating a customized calendar automatically. For instance, the object can include particular query statements and the like.

In accordance with yet another aspect of the subject invention, the system 500 includes a machine learning utility 516 that can assist the system 500 with outputting customized calendars by way of generating inferences relating to creation and storage of the multi-dimensional structure 510. As used herein, the terms to "infer" or "inference" refer generally to the process of reasoning about or inferring states of a system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Thus, for instance, the machine learning utility 516 can determine that a user is located in a particular geographic region, and recognize that a certain language is prevalently utilized in such region. The machine learning utility 516 can then infer that a user wishes to generate a calendar in the language, and cause the question presentment component 504 to present such selection to the user. In another example, the machine learning utility 516 can, over time, learn that a computer is utilized in a manufacturing context. Accordingly, the machine learning utility 516 can infer that the user will wish to generate a manufacturing calendar. Other suitable inferences are contemplated by the inventors of the subject invention and are intended to fall within the scope of the hereto-appended claims.

Now referring to FIGS. 6-9 methodologies in accordance with various aspects of the subject invention are illustrated. While, for purposes of simplicity of explanation, the methodologies are shown and described as a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 6:
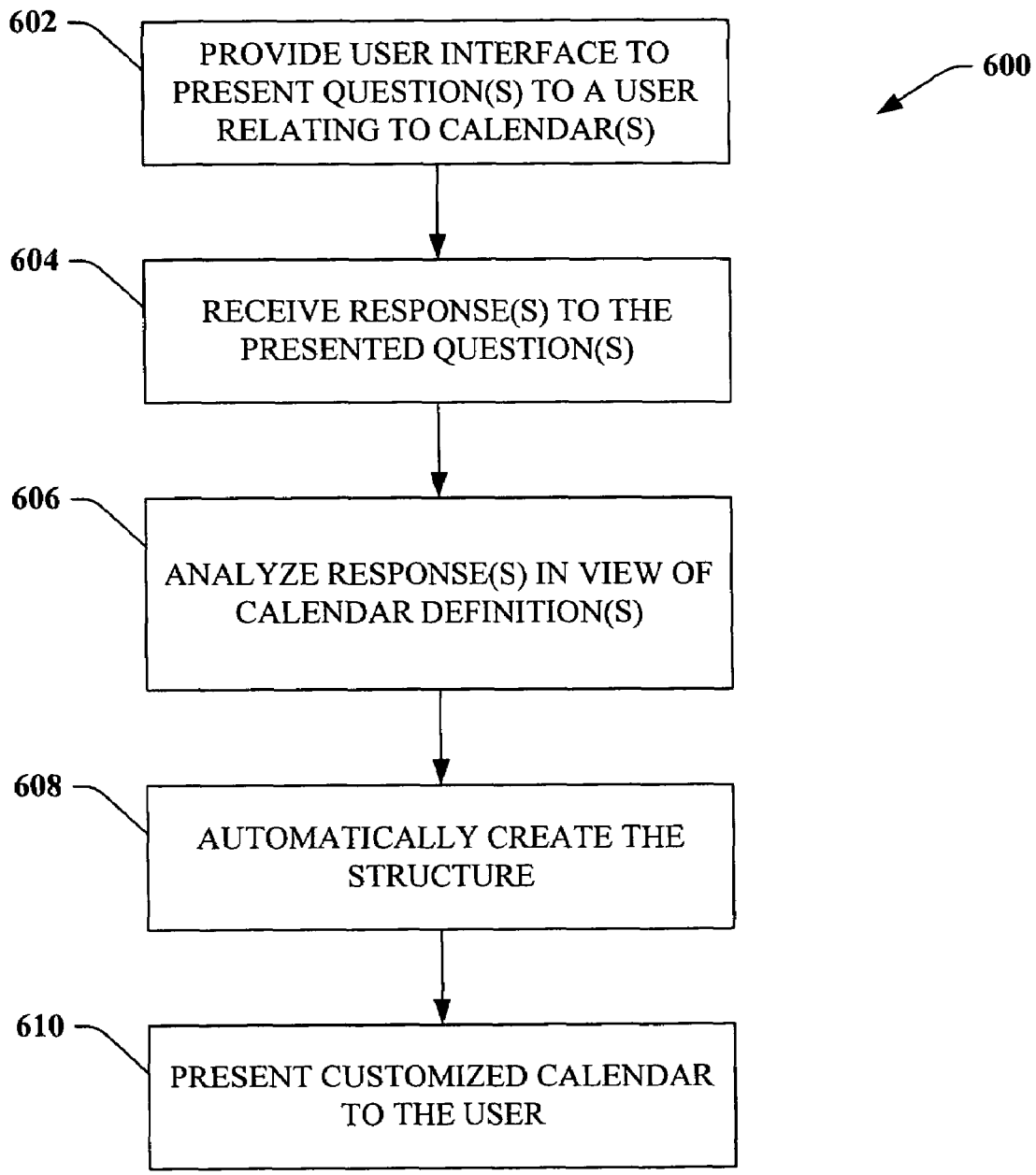
FIG. 6 is a flow diagram illustrating a methodology for automatically generating a customized calendar by way of a multi-dimensional structure in accordance with an aspect of the subject invention.

Now turning solely to FIG. 6, a methodology 600 that facilitates automatically generating a multi-dimensional structure that can be utilized in connection with creating a customized calendar is illustrated. At 602, a user interface is provided, wherein such interface is employed to present questions to a user relating to a calendar. For instance, the questions can relate to a type of calendar desirably created (e.g., Gregorian, fiscal, manufacturing, ... ), parameters associated with the selection (e.g., first day of a fiscal year, ... ), and the like. The user interface can be a graphical user interface, speakers which audibly present the user with questions, or any other suitable interface mechanisms that can be utilized to solicit information from the user.

At 604, responses to presented questions are received. For instance, such responses can be entered by way of radio buttons, pull-down menus, entering data into fields, or any other suitable means for entering data into a graphical user interface. In accordance with another aspect of the subject invention, responses can be received by way of voice-recognition hardware/software. Any suitable manners for receiving responses to the questions, however, are contemplated. At 606, the responses are analyzed in view of calendar definitions that are accessible by an execution engine. For instance, a calendar definition can exist for each possible calendar that can be generated by way of the subject invention. At 608, a multi-dimensional structure utilized to create a customized calendar is automatically generated as a function of the received responses and the calendar definitions. The term "automatically" can refer to an ability to generate the multi-dimensional structure without requiring a user to manually create a spreadsheet table to generate such structure. Rather, by using the methodology 600, the structure can be generated based upon responses to one or more questions. At 610, a customized calendar is presented to the user, wherein such calendar is generated by way of the multi-dimensional structure. For example, data to be placed into the calendar can be obtained through querying against the multi-dimensional structure.

Figure 7:
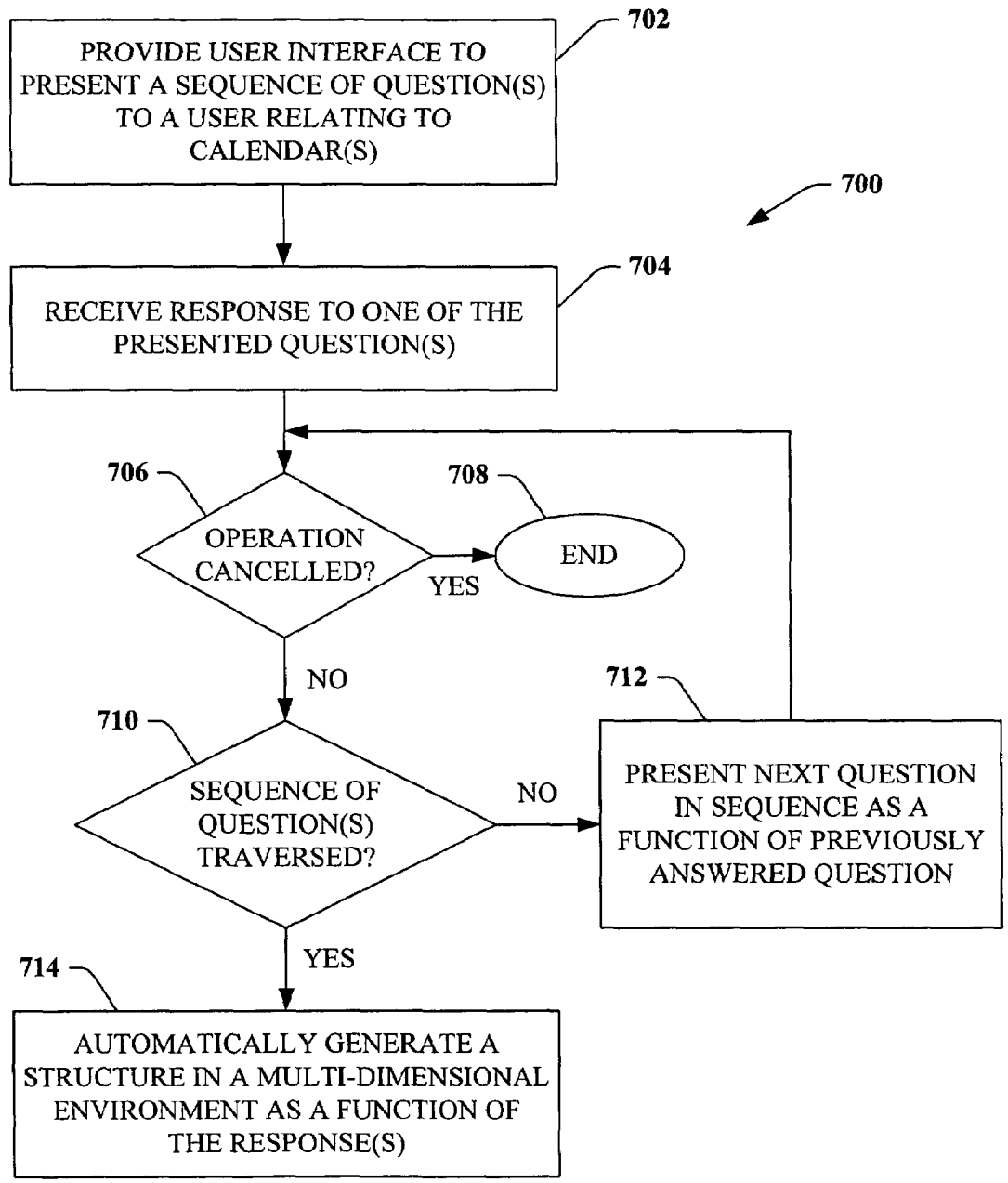
FIG. 7 is a flow diagram illustrating a methodology for traversing a sequence of questions in order to generate a customized calendar in accordance with an aspect of the subject invention.

Turning now to FIG. 7, a methodology 700 that facilitates automatically generating a multi-dimensional structure to be used in connection with creating a customized calendar is illustrated. At 702, a user interface is provided, wherein such interface is employed to present a sequence of questions to a user relating to calendars. In accordance with one aspect of the subject invention, the sequence of questions can be a function of received responses to previous questions. Thus, a second question will depend upon an answer to a first question, a third question will depend upon responses to the first and second questions, and so forth. At 704, a response is received to one of the presented questions (by way, for example, of a graphical user interface, voice recognition software, and the like). At 706, a determination is made regarding whether the user wishes to cancel the operation and cease creation of a customized calendar. For instance, a selectable button can be provided in a user interface that allows the user to cancel creation of the calendar. If the operation is cancelled, then the methodology 700 ends at 708.

If the operation is not desirably cancelled, then a determination is made at 710 regarding whether a sequence of questions has been completely traversed. In other words, a determination is made at 710 regarding whether there is sufficient information to automatically generate a multi-dimensional structure. If the sequence of questions has not been completely traversed, then at 712 a next question in the sequence is presented to the user, and a response to such question is received. The methodology 712 can then return to act 706. If the sequence of questions has been traversed (as determined at 710), then at 714 a structure in a multi-dimensional environment is automatically generated as a function of the responses. This generated multi-dimensional structure can be utilized to create a customized calendar and populate such calendar accordingly.

Figure 8:
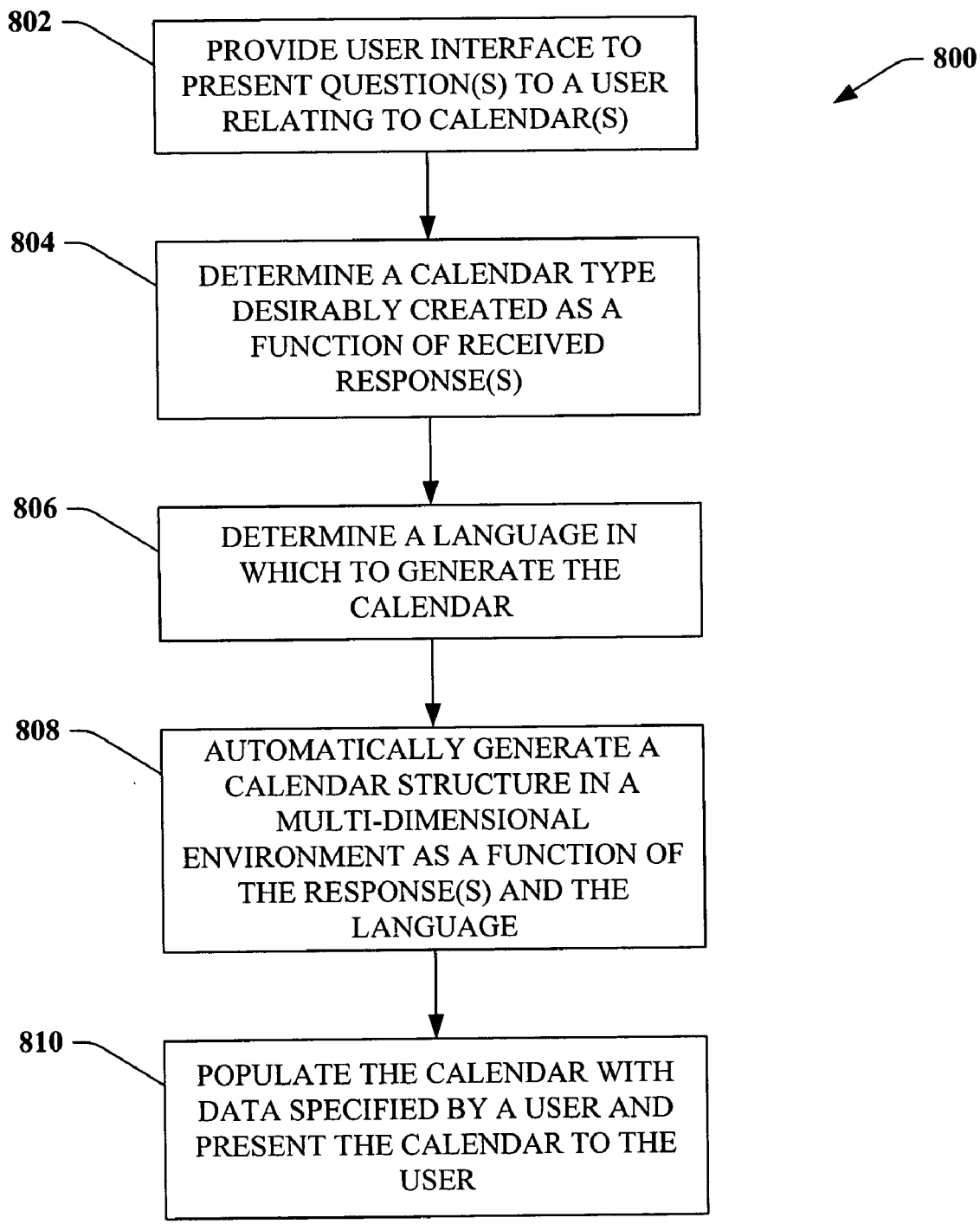
FIG. 8 is a flow diagram illustrating a methodology generating a customized calendar in a chosen language in accordance with an aspect of the subject invention.

Now referring to FIG. 8, a methodology 800 that can be employed to generate a customized calendar is illustrated, wherein the calendar is created by way of automatically generating a multi-dimensional structure. At 802, a user interface is provided, wherein such interface is employed to present questions to a user relating to one or more calendars. For instance, the questions can relate to calendar-type, data to be placed within the calendar, and the like. At 804, a calendar type desirably created is determined as a function of the received responses. For example, the user can provide information indicating that he desirably wishes to create a fiscal calendar. At 806, a language in which to generate the calendar is determined by way of the user responses. For instance, a plurality of selectable languages can be provided to a user in a pull-down menu, and the user can select a desirable language from such pull-down menu.

At 808, a calendar structure is automatically generated in a multi-dimensional environment as a function of the responses. This multi-dimensional structure can be a data cube, a dimension within a cube, a hierarchy within a cube, or any other element that can be related to multi-dimensional structure. At 810, a calendar is created and populated with data specified by the user in a language specified by the user. The calendar is also presented to the user at 810, for example, by way of a graphical user interface or printer.

Figure 9:
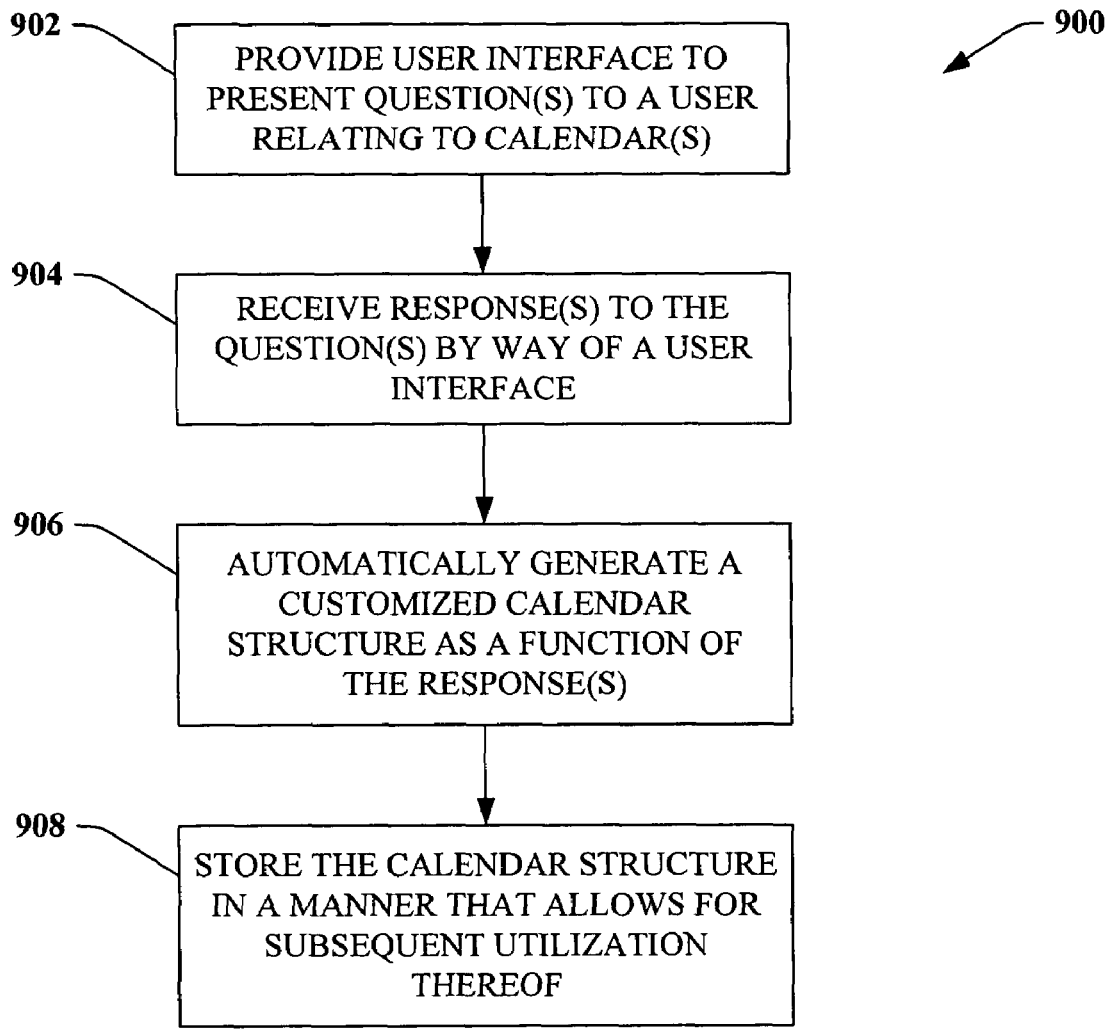
FIG. 9 is a flow diagram illustrating a methodology for storing a multi-dimensional structure relating to a calendar to enable re-utilization thereof in accordance with an aspect of the subject invention.

Now turning to FIG. 9, a methodology 900 for automatically creating a multi-dimensional calendar structure and subsequently utilizing such structure is illustrated. At 902, a user interface is provided to a user, wherein the user interface is employed to present one or more questions to a user relating to disparate calendar types. At 904, responses to the questions are received by way of the user interface (e.g., through fields, radio buttons, pull-down menus, and the like). At 906, a multi-dimensional structure that can be employed to create a customized calendar is generated as a function of the responses. For instance, the multi-dimensional structure can be employed to obtain appropriate data from relational data tables in a much quicker and efficient manner than conventional relational techniques. At 908, the calendar structure is stored in a manner that allows for subsequent utilization thereof. For example, a selectable object can be created and associated with the multi-dimensional structure, wherein upon selection of the object the calendar can be populated with data not available previously.

Figure 10:
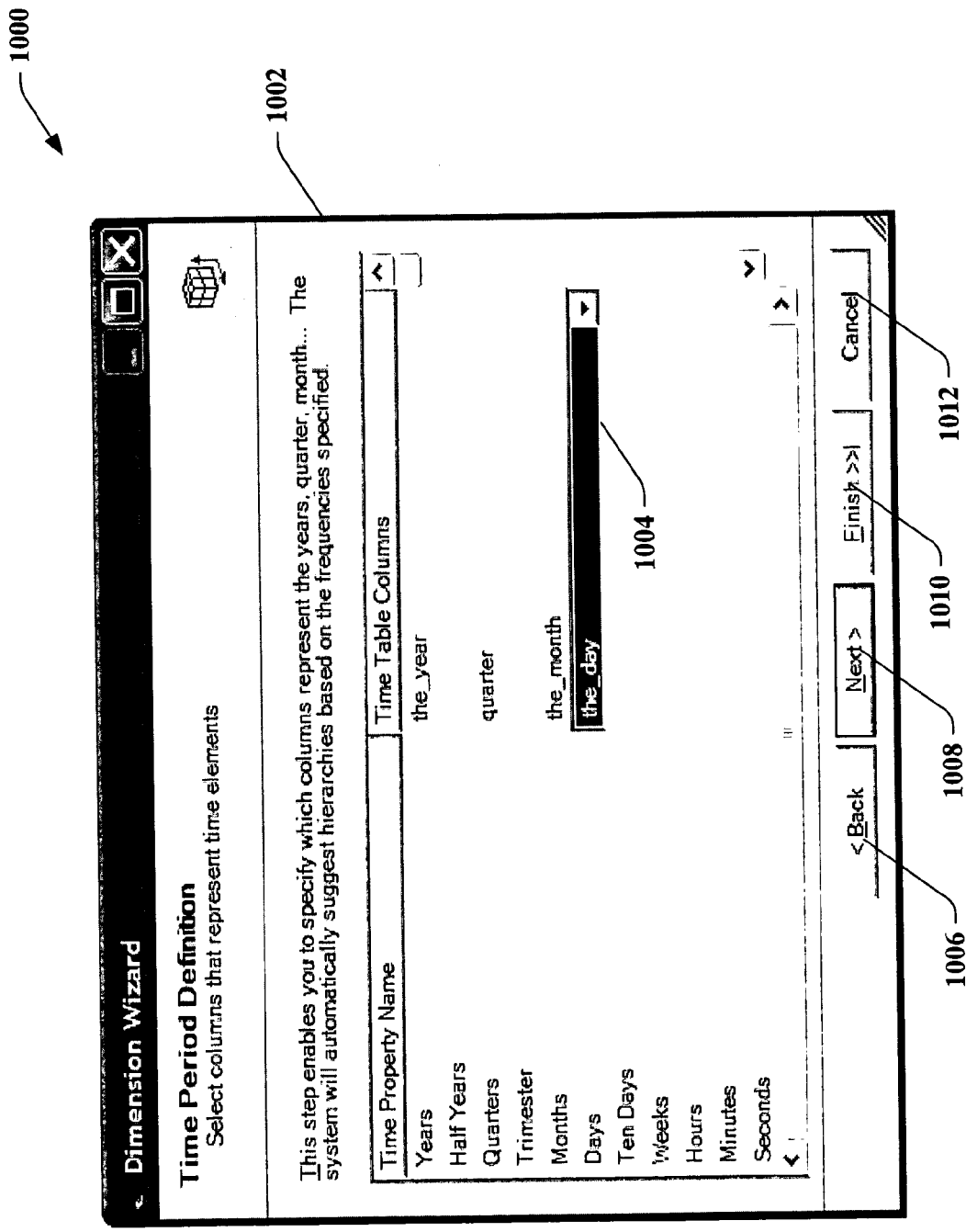
FIG. 10 is a screenshot of a user interface that enables a time property to be mapped to a table column in accordance with an aspect of the subject invention.

Now referring to FIG. 10, a screenshot 1000 of an exemplary user interface 1002 is illustrated. The user interface 1002 allows a user to select columns within data that represent particular periods of time. For instance, the user interface 1002 can enable a user to select which columns in data represent years, half-years, quarters, trimesters, and so on. For instance, pull-down menus (such as a pull-down menu 1004) can be utilized to enable a user to select columns to associate with time properties. Various selectable buttons 1006-1012 can also be provided within the user interface 1002 to enable the system to proceed to a subsequent user interface, return to a previous user interface, finish an operation, and or cancel an operation. Upon assignment of appropriate columns to time properties, time dimension hierarchies can be generated. In accordance with one particular aspect of the subject invention, if both a quarter time property and a trimester time property are selected, two distinct hierarchies can be generated: a first hierarchy that includes all selected frequencies except trimester, and a second hierarchy that includes all selected frequencies except quarter (and possibly semester or half-year). For a specific example, if time properties day, week, month, quarter, trimester, semester, and year are assigned table columns, then the following two hierarchies can be generated:

| Hierarchy 1 | Hierarchy 2 |
|---|---|
| Year | Year |
| Semester | |
| Quarter | Trimester |
| Month | Month |
| Day | Day |

Two disparate hierarchies are created because a trimester does not rollup to a semester, and thus the trimester-based hierarchy does not contain a semester level. Further, a time property relating to a week may not be associated with higher-level time properties (e.g., quarters, half-years, months) other than a time property relating to a year. For instance, if a time property relating to a week is assigned a column from a table, then a separate hierarchy can be generated. For instance, if time properties relating to years, semesters, quarters, months, weeks, and days are selected, the three following separate hierarchies can be created:

| Hierarchy 1 | Hierarchy 2 | Hierarchy 3 |
|---|---|---|
| Year | Year | Year |
| Semester | | Week |
| Quarter | Trimester | Day |
| Month | Month | |
| Day | Day | |

Other time-properties with a frequency less than a week can be built hierarchically between weeks. In yet another example, if a time property relating to a repeating ten day period and a time property relating to a week are selected, then separate hierarchies can be generated. Specifically, if frequency-related time properties year, semester, trimester, quarter, month, 10 days, week and day are selected, then the following three hierarchies can be created.

| Hierarchy 1 | Hierarchy 2 | Hierarchy 3 |
|---|---|---|
| Year | Year | Year |
| Semester | | Week |
| Quarter | Trimester | Day |
| Month | Month | |
| 10 Days | 10 Days | |
| Day | Day | |

If time properties not associated with a particular frequency, such as day of a year, day of a quarter, day of a month, week of a quarter, or the like are associated with a time column, such properties may not be included within hierarchies, but can be employed to create attributes. As stated previously, the selectable columns that can be mapped with time properties can be interpreted as one or more questions, and the term as utilized in the claims is intended to encompass such selectable entities.

Figure 11:
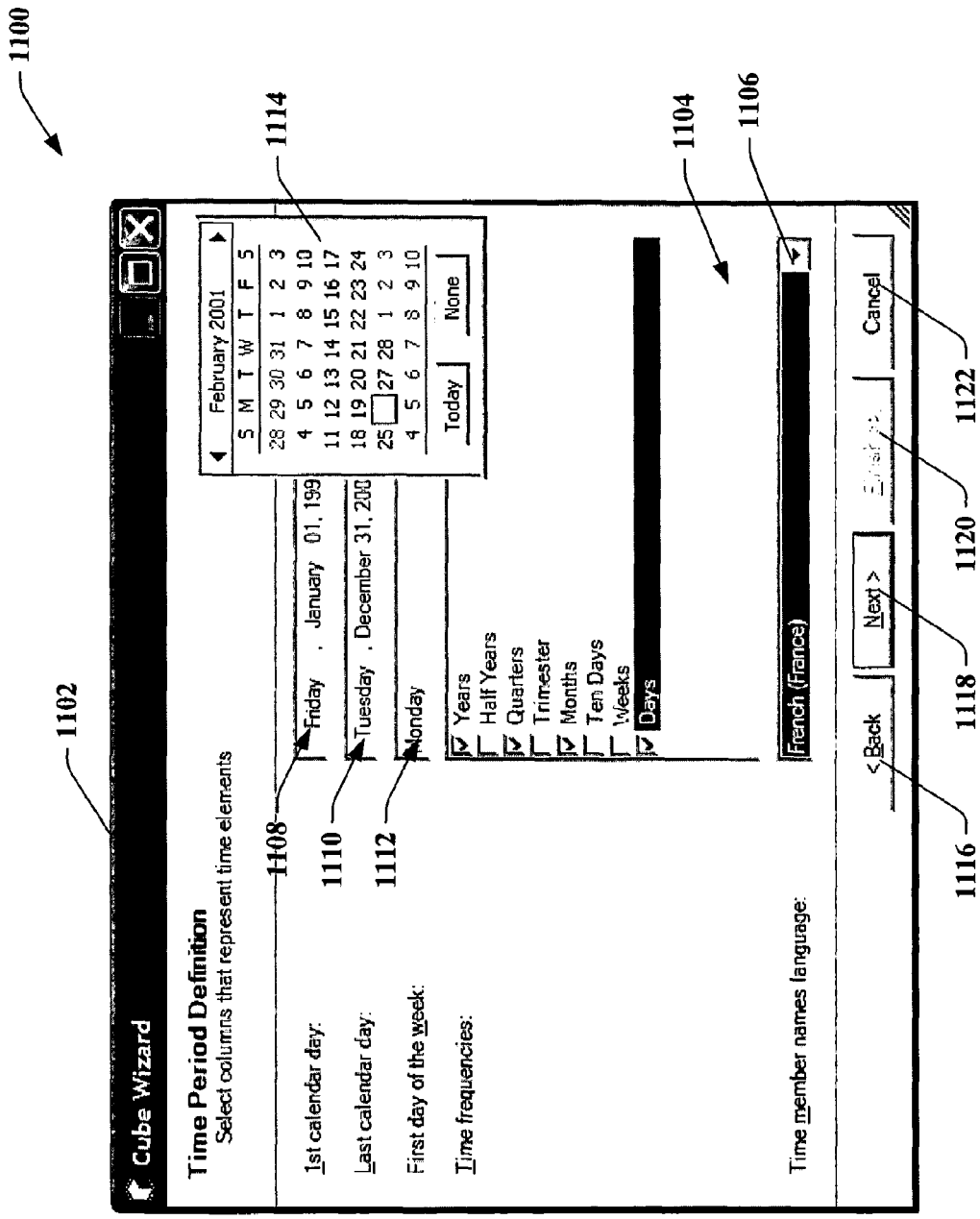
FIGS. 11-12 are screenshots of user interfaces that can be employed in connection with the subject invention.

Referring now to FIG. 11, a screenshot 1100 of an exemplary user interface 1102 that can be utilized in accordance with one or more aspects of the subject invention is illustrated. The user interface 1102 includes a field 1104 that comprises properties previously defined in the user interface 1002 (FIG. 10). The properties displayed in the field 1104 are selectable, and can thus be employed to generate a customized calendar. The user interface 1102 further includes a pull-down menu 1106 that allows a user to select a language in which a calendar is to be generated. Moreover, the illustrated user interface 1102 can further include pull-down menus 1108-1112 that enable a user to specify a length of time in which the calendar is to be generated. For example, the screenshot 1100 shows that the user has selected that the calendar be generated from between Jan. 1, 1999 to Dec. 31, 2000 (a two year period). The user can also select which day is a first day of the week by using the pull-down menu 1112. For instance, in some countries Sunday is the first day of the week, while in disparate countries Saturday is the first day of the week, and so on. A calendar function 1114 can be presented to the user to enable such user to easily choose days of a week, calendar days, and the like. Again, selectable entities within the pull-down menus 1106-1112 and selectable entities within the field 1104 can be referred to as questions presented to the user, and the user selections can be referred to as responses to such questions. The exemplary user interface 1102 can further include buttons 1116-1122 that enable a user to proceed with a calendar generation process, go to a previous user interface to alter properties, cancel an operation, and the like.

Figure 12:
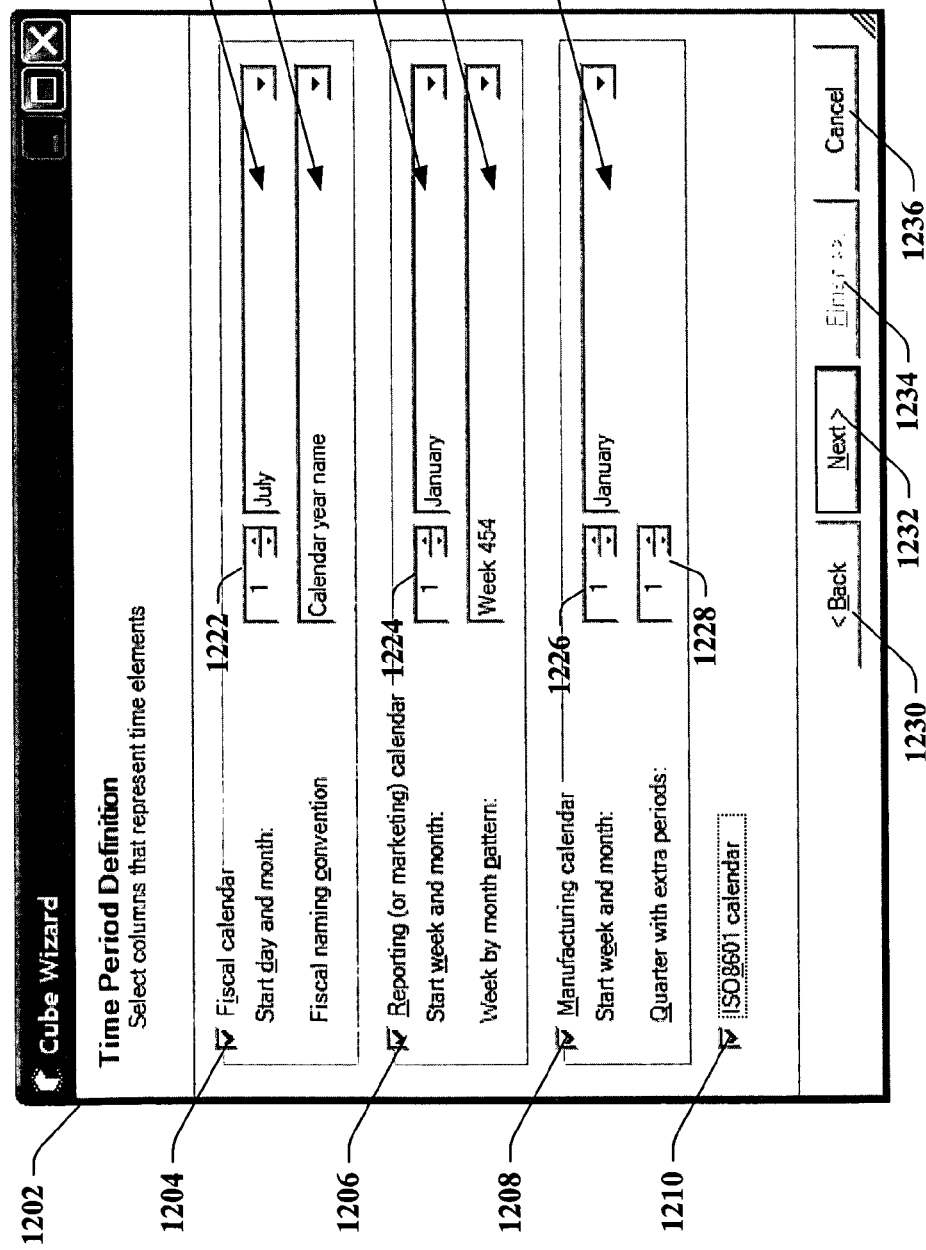

Turning now to FIG. 12, a screenshot 1200 of an exemplary user interface 1202 that can be employed in connection with one or more aspects of the subject invention is illustrated. The user interface 1202 includes checkboxes 1204-1210 that relate to disparate types of calendars that can be created. In this example, the available calendars are a fiscal calendar, a reporting calendar, a manufacturing calendar, and an ISO8601 calendar. Any combination of these can be selected, and one or more aspects of the subject invention can be employed to generate the calendars. The user interface 1202 also includes various pull-down menus 1212-1220, wherein the user can employ such pull-down menus 1212-1220 to further define aspects of the selected calendars. For instance, with respect to a fiscal calendar, the pull-down menu 1212 can be employed to select a month in which a fiscal year begins. Similarly, with respect to a reporting calendar, the pull-down menu 1216 can be utilized to select a month in which reporting is to begin. The user interface 1202 also includes fields 1222-1228 that can be utilized to further customize a calendar. For instance, the field 1226 allows a user to specify a start week within a selected month. The exemplary user interface 1202 can further comprise a plurality of selectable buttons 1230-1236 that allow a user to navigate through other user interfaces to modify and/or complete a calendar generation process.

Figure 13:
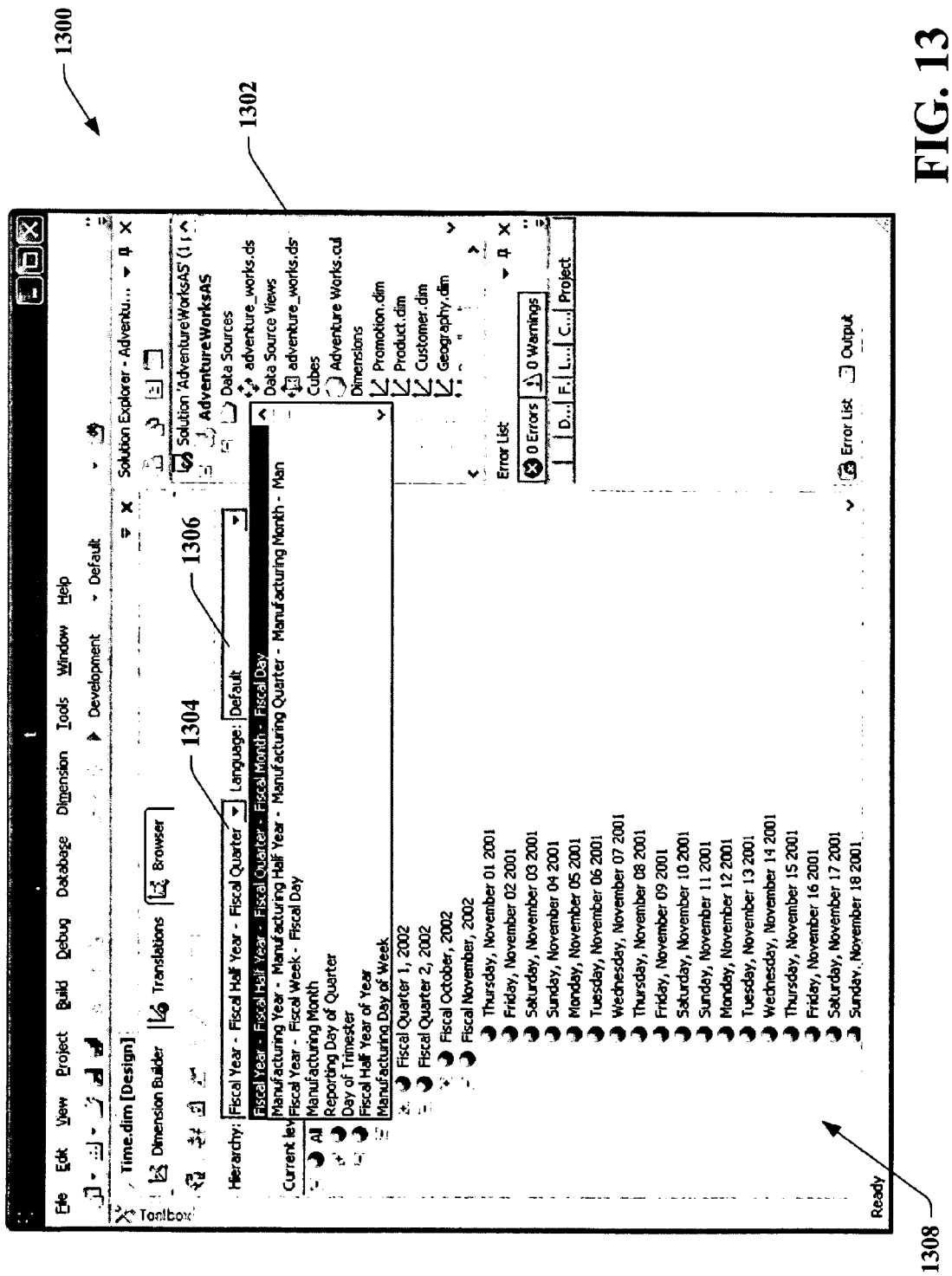
FIGS. 13-15 are screenshots of user interfaces that enable a user to view aspects of customized calendars in accordance with an aspect of the subject invention.

Now referring to FIG. 13, a screenshot 1300 of an exemplary user interface 1302 that can be utilized in connection with the subject invention is illustrated. The user interface 1302 includes a pull-down menu 1304 that enables a user to select a hierarchy of a calendar that can be displayed to the user. A disparate pull-down menu 1306 also exists within the user interface 1302 that enables a user to select a language in which to display the calendar (and data therein). Further, the user interface 1302 includes a field 1308 that includes a calendar displayed as desired by a user. Upon selection of a particular day, data relating to such day can be presented. Furthermore, the field 1308 can display comparisons between different days if desired.

Figure 14:
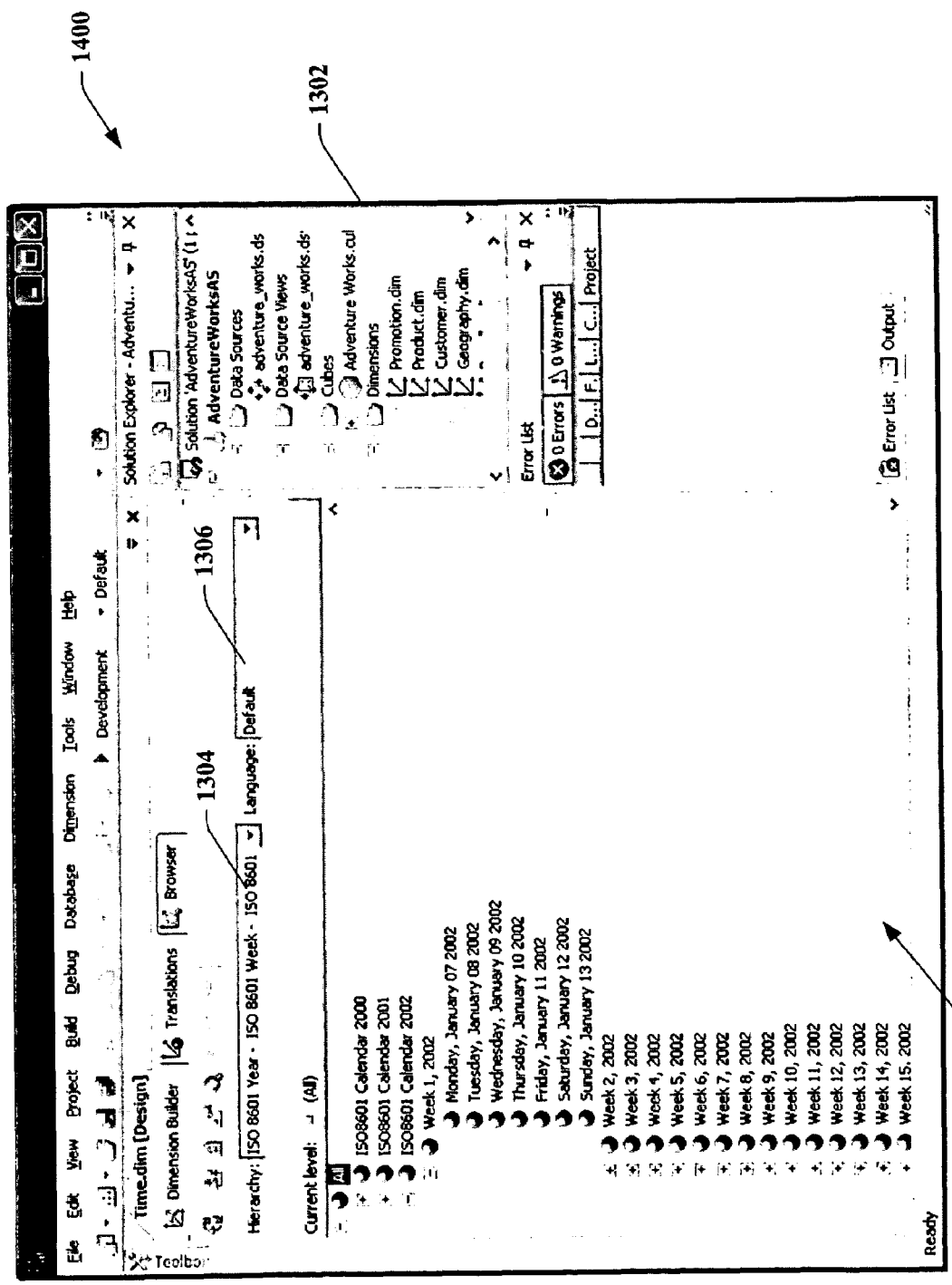
Figure 15:
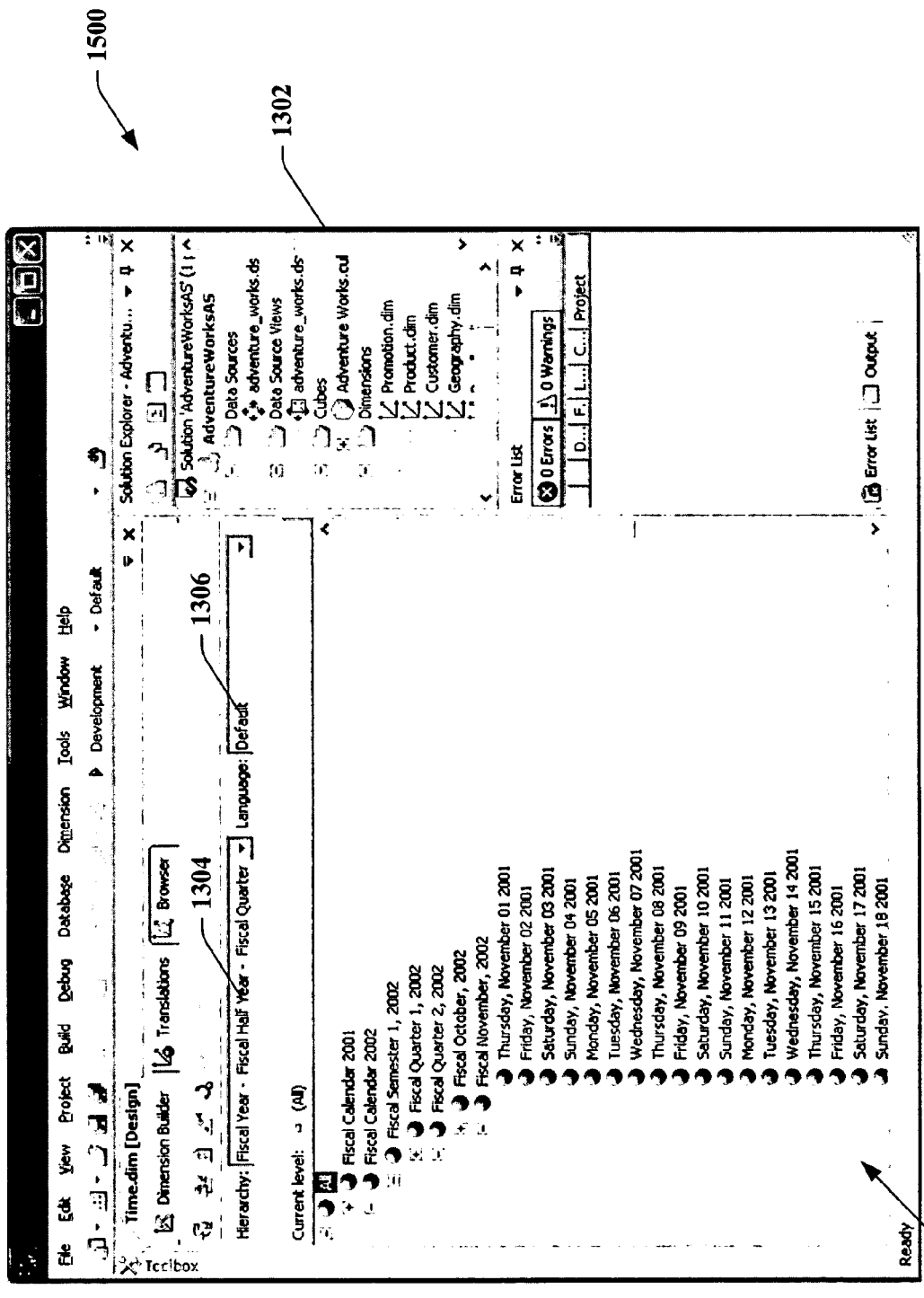

Turning briefly to FIG. 14, a screenshot 1400 of the exemplary user interface 1302 (FIG. 13) is illustrated. The screenshot 1400 shows that a hierarchy relating to an ISO 8601 calendar has been selected from the pull-down menu 1304 by a user. The field 1308 then displays the hierarchy accordingly. Now referring to FIG. 15, a disparate screenshot 1500 of the user interface 1302 (FIGS. 13 and 14) is illustrated. A hierarchy relating to a fiscal calendar has been selected from the pull-down menu 1304, and the field 1308 has displayed the hierarchy accordingly.

Figure 16:
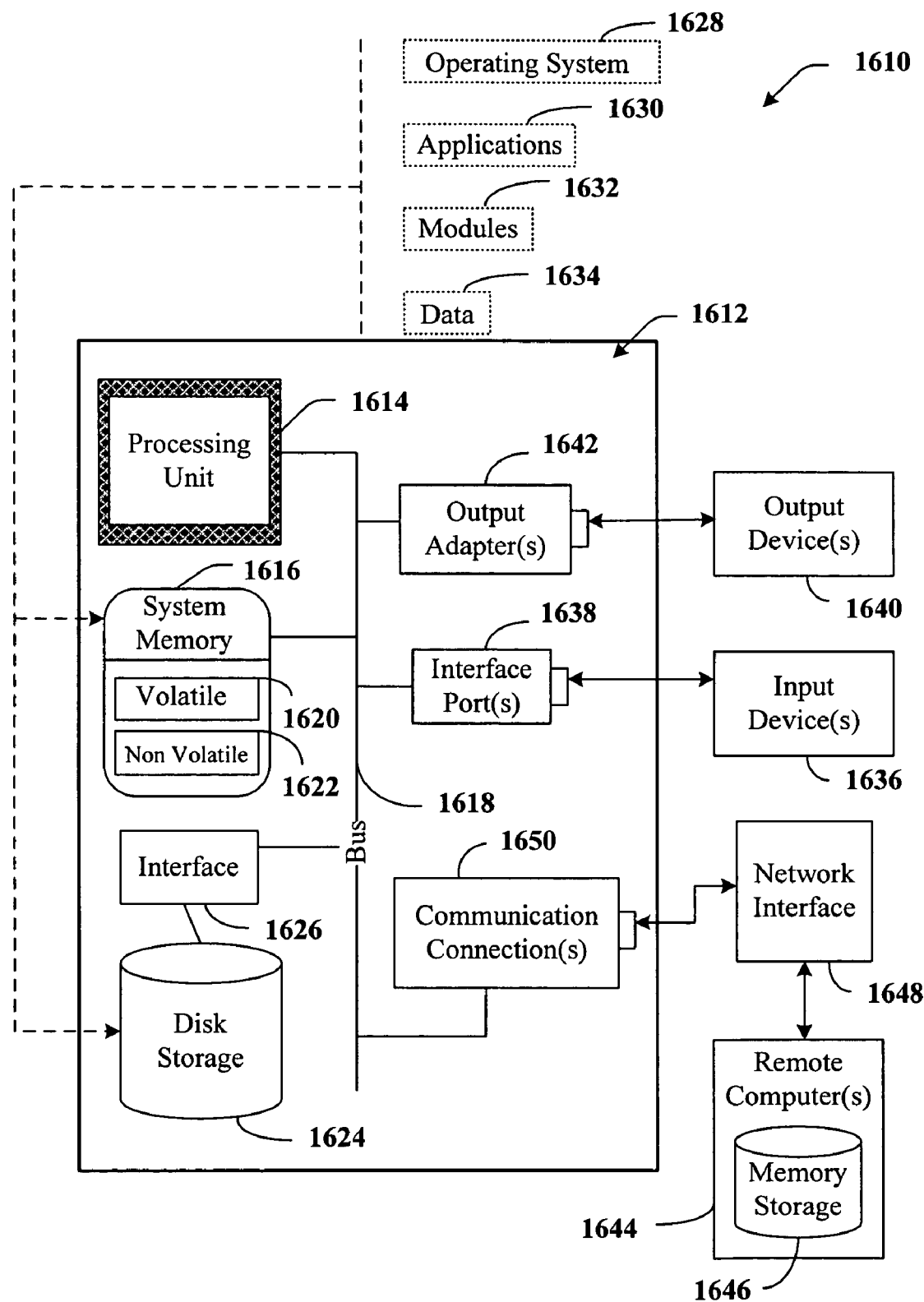
FIG. 16 is an exemplary computing environment that can be utilized in connection with the subject invention.

In order to provide additional context for various aspects of the subject invention, FIG. 16 and the following discussion are intended to provide a brief, general description of a suitable operating environment 1610 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1610 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 16, an exemplary environment 1610 for implementing various aspects of the invention includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614.

The system bus 1618 can be any of several types of bus structures including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable ROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/nonvolatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that the subject invention can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapter 1642 is provided to illustrate that there are some output devices 1640 like monitors, speakers, and printers among other output devices 1640 that require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

Figure 17:
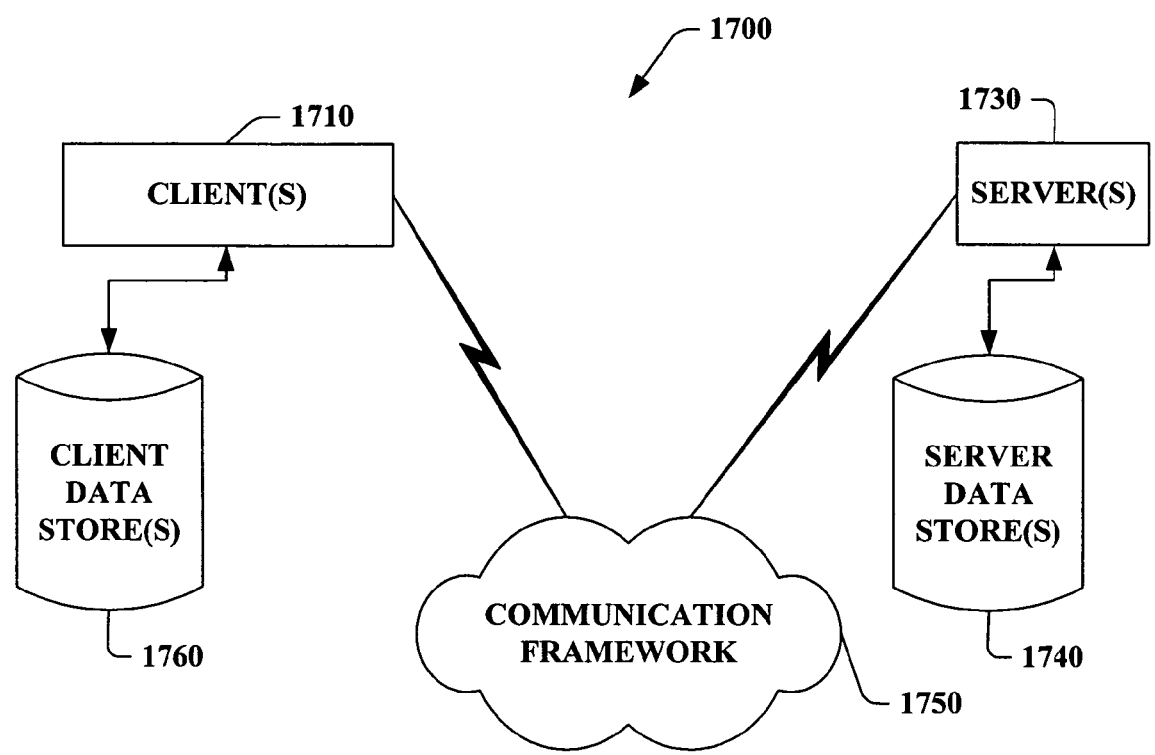
FIG. 17 is an exemplary operating environment that can be employed in connection with the subject invention.

FIG. 17 is a schematic block diagram of a sample-computing environment 1700 with which the subject invention can interact. The system 1700 includes one or more client(s) 1710. The client(s) 1710 can be hardware and/or software (e.g., threads, processes, computing devices). The system 1700 also includes one or more server(s) 1730. The server(s) 1730 can also be hardware and/or software (e.g., threads, processes, computing devices). The servers 1730 can house threads to perform transformations by employing the subject invention, for example. One possible communication between a client 1710 and a server 1730 can be in the form of a data packet adapted to be transmitted between two or more computer processes. The system 1700 includes a communication framework 1750 that can be employed to facilitate communications between the client(s) 1710 and the server(s) 1730. The client(s) 1710 are operably connected to one or more client data store(s) 1760 that can be employed to store information local to the client(s) 1710. Similarly, the server(s) 1730 are operably connected to one or more server data store(s) 1740 that can be employed to store information local to the servers 1730.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented calendar customization system, comprising the following components stored in a computer memory:

an interface component that receives responses to one or more questions relating to selecting a calendar type from a plurality of calendar types associated with one or more of a Gregorian calendar, a fiscal calendar, a reporting calendar, a manufacturing calendar or an ISO8601 calendar, the interface component comprising a question presentation component that determines a sequence of questions to be presented to a user wherein a second question in the sequence depends upon response to first question and a third question depends upon responses to the first and second question, the questions comprising type of a desired calendar, language in which to present the calendar, hierarchy of the calendar, first day of the calendar, beginning of a fiscal year, first day of the week, a month in which a fiscal year begins, a month in which reporting is to begin and particular periods of time within data in the calendar, the received responses determines a desired calendar type and parameterization of a desired calendar structure;

a machine-learning utility that generates inferences regarding automatic selection of a calendar type from the plurality of calendar types based on analysis relating to one or more of user history or user context; and an execution engine that automatically generates a multi-dimensional structure for the selected calendar type, wherein the structure is generated as at least one of a function of the responses or the automatic selection.

2. The system of claim 1, wherein the execution engine is associated with schemas employed in connection with creating the multi-dimensional structure.

3. The system of claim 1, wherein the question presentation component presents one or more questions to a user to enable the interface component to receive the responses.

4. The system of claim 3, wherein the one or more presented questions are selected from a list of questions.

5. The system of claim 4, further comprising an updating component that updates the list of questions to enable further customization of the multi-dimensional structure.

6. The system of claim 3, wherein the machine-learning utility analyzes one or more of the user history or the user context to generate inferences relating to which questions to present to the user.

7. The system of claim 1, wherein the question presentation component presents a series of questions to a user to enable the interface component to receive the responses, a sequence of the series of questions is a function of previously received responses.

8. The system of claim 1, wherein the execution engine is an OLAP engine.

9. The system of claim 1, further comprising a definition relating to the structure embedded within the execution engine.

10. The system of claim 1, further comprising a component that facilitates storing the multi-dimensional structure for later utilization.

11. A computer-implemented method for generating a calendar structure, comprising:

receiving a response with respect to a sequence of questions related to selecting a calendar type from a plurality of calendar types associated with one or more of a Gregorian calendar, a fiscal calendar, a reporting calendar, a manufacturing calendar or an ISO8601 calendar, wherein a second question in the sequence depending upon response to first question and a third question depending upon responses to the first and second question, the questions comprising type of a desired calendar, language in which to present the calendar, hierarchy of the calendar, first day of the calendar, beginning of a fiscal year, first day of the week, a month in which a fiscal year begins, a month in which reporting is to begin and particular periods of time within data in the calendar;

accessing a definition of one or more structures in a multi-dimensional environment based at least on the received responses, the one or more structures relate to a selected calendar type;

generating inferences regarding automatic selection of a calendar type from the plurality of calendar types based at least on one or more of user history or user context;

determining a desired calendar type and parameterization of a desired calendar structure based at least on the received responses or the generated inferences; and automatically generating the one or more multi-dimensional structures and displaying at least a portion of a calendar generated in accordance with the selected calendar type.

12. The method of claim 11, further comprising receiving a plurality of responses with respect to a plurality of questions.

13. The method of claim 12, further comprising determining a sequence in which to present the plurality of questions to a user.

14. The method of claim 11, further comprising storing the one or more structures to enable subsequent use thereof.

15. The method of claim 11, further comprising utilizing an OLAP engine to automatically generate the multi-dimensional structures.

16. A computer-implemented customizable calendar generation system, comprising the following means stored in a computer memory:

means for obtaining responses to a sequence of questions presented to a user associated with selecting at least a calendar type from a plurality of calendar types associated with one or more of a Gregorian calendar, a fiscal calendar, a reporting calendar, a manufacturing calendar or an ISO8601 calendar, wherein a second question in the sequence depending upon response to first question and a third question depending upon responses to the first and second question, the questions comprising type of a desired calendar, language in which to present the calendar, hierarchy of the calendar, first day of the calendar, beginning of a fiscal year, first day of the week, a month in which a fiscal year begins, a month in which reporting is to begin and particular periods of time within data in the calendar;

means for automatically selecting a calendar type from the plurality of calendar types based on one or more of a user history or a user context associated with the computer; and means for automatically generating a calendar of the selected calendar type and having parameterization of a desired calendar structure as a function of the obtained responses or as a function of the automatically selected calendar type, the calendar based at least in part upon a multi-dimensional structure.

17. The system of claim 16, further comprising means for determining which questions to present to the user.

* * * * *